United States Patent [19]
Rilly

[11] Patent Number: 4,614,998
[45] Date of Patent: Sep. 30, 1986

[54] DC-AC CONVERTER FOR A LOAD WITH AN INDUCTIVE COMPONENT

[75] Inventor: Gerard Rilly, VS-Pfaffenweiler, Fed. Rep. of Germany

[73] Assignee: Deutsche Thomson Brandt GmbH, VS-Villingen, Fed. Rep. of Germany

[21] Appl. No.: 690,859

[22] Filed: Jan. 11, 1985

[30] Foreign Application Priority Data

Jan. 11, 1984 [DE] Fed. Rep. of Germany ....... 3400671

[51] Int. Cl.⁴ ......................................... H02M 3/335
[52] U.S. Cl. ..................................... 363/16; 363/97; 363/131
[58] Field of Search ............... 363/16, 17, 97, 98, 363/131, 132, 133, 134, DIG. 1; 323/274, 289; 307/270

[56] References Cited

U.S. PATENT DOCUMENTS 4,493,017 1/1985 Kammiller et al. ................ 363/132

FOREIGN PATENT DOCUMENTS 687549 9/1979 U.S.S.R. ............................. 363/132
717741 2/1980 U.S.S.R. ............................. 323/274
1035591 8/1983 U.S.S.R. ............................. 363/98

Primary Examiner—Peter S. Wong
Assistant Examiner—Judson H. Jones
Attorney, Agent, or Firm—Horst M. Kasper

[57] ABSTRACT

A DC-AC converter generates alternating current from direct current voltage for energizing a load with an inductive component. Two transistors connected in series are disposed in a so-called half bridge construction. Two free wheeling diodes are connected in parallel with the transistors and carry the current during the rest time of the transistors. The diodes are connected to the connection point of the two transistors through a control winding of a transformer. The control winding of the transformer controls the transistors. Therefore no additional driver circuit and no outside energy source are necessary for the control and commuting of the transistors of the DC-AC converter circuit.

16 Claims, 7 Drawing Figures

DC-AC CONVERTER FOR A LOAD WITH AN INDUCTIVE COMPONENT

BACKGROUND OF THE INVENTION

1. Field of the Invention

The present invention relates to a DC-AC converter which generates alternating current for a load with an inductive component from direct current voltage where the frequency of the generated alternating voltage is in the neighborhood of from about 10 to 100 kH and can be about 30 kH.

2. Brief Description of the Background of the Invention Including Prior Art

DC-AC converters are known (Electronique Industrielle, Issue 50, Jan. 4, 1983, pp. 35–41) where a direct current voltage is applied to a so-called half bridge with two power transistors connected in series. The power transistors are gated alternatingly conducting and generate at their connection point an alternating voltage for the load. Theoretically, the first transistor should be switched off at a certain point in time, and the second transistor should be switched on at the same point in time. The inductive component of the load however, does not allow a sudden current interruption. On the other hand, the transistors would be endangered if they are both simultaneously conducting for a short time. Because of the tolerances and the depletion and emptying times of the transistors, such an exact circuit is possible only with complicated driver circuits provided as microprocessors.

Therefore it is known to provide a rest time between such successive conducting phases of the two transistors to provide safety, and during this rest time the two transistors are nonconducting. This assures that the two transistors cannot be conducting simultaneously. In order to allow the required current flow during this rest time, the transistors have poled diodes connected in parallel opposite to their collector-emitter sections, and the diodes pass the current during the rest time for a short time. In each case a capacitor is disposed in parallel to the diodes which limits the steepness of slopes of the generated alternating current.

The two transistors are in this case alternatingly in counter cycles conductingly gates and blocked by the windings of a transformer. An additional driver circuit has to be coordinated to the transformer for this purpose, where the driver circuit effects this gating and blocking of the transistors. Such a driver circuit requires additional expenditures for switching procedures and energy. For example, a driver circuit can be an additional stage which is fed with a separate operating voltage.

SUMMARY OF THE INVENTION

1. Purposes of the Invention

It is an object of the present invention to reduce the switching and energy expenditures for controlling transistors in power circuits. It is another object of the invention to eliminate in a DC-AC converter the requirement of a driver stage.

It is another purpose of the present invention to provide a self commuting system where the energy for the control of the transistors is derived directly from the generated alternating voltage.

These and other objects and advantages of the present invention will become evident from the description which follows.

2. Brief Description of the Invention

The present invention provides a DC-AC converter for energizing a load including an inductive component. This DC-AC converter comprises a direct current voltage source, a first transistor connected with one of its power leads to the direct current voltage source and having a second power lead, a second transistor connected with one of its power leads to the second power lead of the first transistor via a first junction point and a load including an inductive component and having an input. A first free wheeling diode which has a terminal connected to the direct current power source is connected at a second terminal to a second free wheeling diode via a second junction point which is further connected to the input of the load. An auxiliary winding of a transformer connects the first junction point to the second junction point. A second control winding of the transformer is connected to a control input of the second transistor and to the second power lead of the second transistor. An electronic switch is connected in parallel to the second winding of the transformer. A control circuit is connected with an output to a control input of the electronic switch and has an input connected to the second junction point for initiating a periodic switching.

A first control winding of the transformer can be connected to a control input of the first transistor and to the first junction point. The windings of the transformer are switched over such that the transistors become alternatingly conducting and then are both blocked during an intermediate rest time. The free wheeling diodes can take over the current conduction during the intermediate rest time. The control sections of the first and second transistor can be connected to a first control winding and to a second control winding of the transformer. The first and second control winding and the auxiliary winding can have such a rotary winding sense and can be connected with their terminals such that the current flowing through the auxiliary winding of the first and second transistor generate in the first and second control winding the base currents necessary for the control of the first and second transistors. The control section of the second transistor can be connected to the winding running parallel relative to the electronic switch.

A first capacitor can be disposed in parallel to the first free wheeling diode, and a second capacitor can be disposed in parallel to the second free wheeling diode. The first capacitor can be disposed in parallel to the collector-emitter section of the first transistor, and the second capacitor can be disposed in parallel to the collector-emitter section of the second transistor.

As second voltage source, which can be provided by a parallel connection of a diode and a capacitor, can be disposed in the connection provided between the first control winding and the base of the first transistor with a polarity corresponding to a blocking of the first transistor.

A third voltage source, which can be provided by a parallel connection of a diode and a capacitor, can be disposed in the connection provided between the second control winding and the base of the second transistor with a polarity corresponding to a blocking of the second transistor.

The control circuit can comprise a voltage limiter, a time constant member, and a threshold circuit. The threshold circuit can be constructed with two adjustable threshold values for changing the frequency and the pulse duty factor.

According to another aspect, the present invention further provides a DC-AC converter for energizing a load including an inductive part which comprises a series connection of two transistors disposed between the direct current voltage terminals of a DC power supply, a transformer having first and second windings which are switched such that they are alternatingly conducting and are blocked during an intermediate rest time and two free wheeling diodes disposed in parallel to the transistors taking up the current during the intermediate rest time. A voltage output is derived from a connection point of the first and second transistor. An additional winding of the transformer connects a junction point of the free wheeling diodes to the junction point of the two transistors. An electromagnetic switch is disposed in parallel to one of the windings of the transformer. A control circuit has an input connected to the voltage output and an output controlling the electronic switch.

Another aspect of the present invention provides a method for converting direct current into alternating current for energizing a load including an inductive part which comprises the following. The conduction through a control transistor is switched by a signal from a control circuit. Windings of a transformer are short circuited by the conducting control transistor, and the transmission of a second transistor is blocked since its base is connected to one of the short circuited windings. A second capacitor connected to a power terminal of the second transistor is charged. Then a first capacitor connected to a power terminal of a first transistor is charged. The direction of an output current coming from a junction point of a connection between the two capacitors is reversed. The first transistor is put into a conducting state. A current flow in the second transistor is blocked. The transformer is operated in a short circuit mode. The current flow from the first transistor is moved to a first capacitor in parallel to a diode.

The alternating voltage generated in this fashion can be fed to loads of for example the following kind: AC current motors without commuters, inductors, transformers, luminescent lamps operating at a frequency of about 30 kH and cooking plates and ovens with inductive heating where in each case only the container for the food is heated by a magnetic field, preferably by an electromagnetic field generated for a microwave oven.

Several advantages rest from the construction of the present invention. No separate driver stage is required for the control and commuting of the two transistors since control and gating is performed directly with the transformer via the control windings contained therein based on the magnetic energy of the transformer. Therefore, in addition to the energy savings of the power transistors, no additional energy from the outside has to be provided for the control of the power transistors. The recited transformer does not have to be constructed in a very precise fashion. The invention provides a self commuting system where the energy for the control of the transistors is derived directly from the generating alternating voltage. Since the two transistors in each case automatically block each other by the evaluation of their currents, it is assured that the switching of the two transistors is without problem in a counter cycle. The circuit can be provided as a self oscillating circuit. Furthermore, the frequency of the generated alternating voltage can be changed for adaptation to various loads. In addition, the pulse duty factor of the generated alternating voltage can be changed in order to change thereby the effective value of this alternating voltage for adaptation to various loads.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing, in which are shown several of the various possible embodiments of the present invention.

The lower case letters in the diagrams indicate at which points of the circuits voltages and the currents are generated according to the diagrams.

DESCRIPTION OF INVENTION AND PREFERRED EMBODIMENTS

In accordance with the present invention there is provided a DC-AC converter for energizing a load (V) with an inductive component (L) where a series connection of two transistors T1, T2 is disposed between terminals +B and ground of a DC current source. The transistors are switched by the windings S2, S3 of a transformer TR1 such that they become alternatingly conducting, and intermediately during a rest time the two transistors are blocked. Free wheeling diodes D1, D2 are disposed in parallel to the transistors T1, T2, which diodes accept in each case the current during the rest time, and the output voltage Us is derived from the connection point h of the transistors T1, T2. The connection point i of the free wheeling diodes D1, D2 is connected via an additional winding S1 of the transformer TR1 to the connection point h of the transistors T1, T2, and an electronic switch T3 is disposed in parallel to a winding S3 of the transformer TR1. The electronic switch T3 is controlled by the output Us via a control circuit Cd1 for starting of the periodic switching.

The control sections of the first and second transistors T1, T2 can be connected to a first and second control winding S2, S3 of the transformer TR1. The first and second control winding S2, S3 and the additional winding S1 can be provided with such a winding behavior and can have their poles connected such that the current iT1, iT2 of the transistors T1, T2 flowing through the additional winding S1 is generated in the first and second control winding S2, S3 which generates a basis current required for the control of the transistors T1, T2. The control section of the second transistor T2 can be connected to the winding S3 disposed in parallel to the switch T3. A capacitor C1, C2 can be disposed in each case in parallel to the collector-emitter section of the transistors T1, T2 or in parallel to the diodes D1, D2.

A voltage source E1, E2 poled according to the blocking direction of the transistors T1, T2 can be disposed in each case between the control winding S2, S3 and the base of the respective transistor T1, T2. The voltage source E1, E2 can be provided by parallel connection of diodes D5, D6 with a capacitor C3.

The control circuit can be provided with a voltage limiter D8, D7, a time constant member R4, C4 and a threshold circuit T4, T5, U3, U4. The threshold circuit T4, T5, U3, U4 can be provided with two thresholds. The threshold values for changing the frequency and the pulse duty factor of the output voltage Us can be adjustable (terminal t in FIG. 1).

Figure 1:
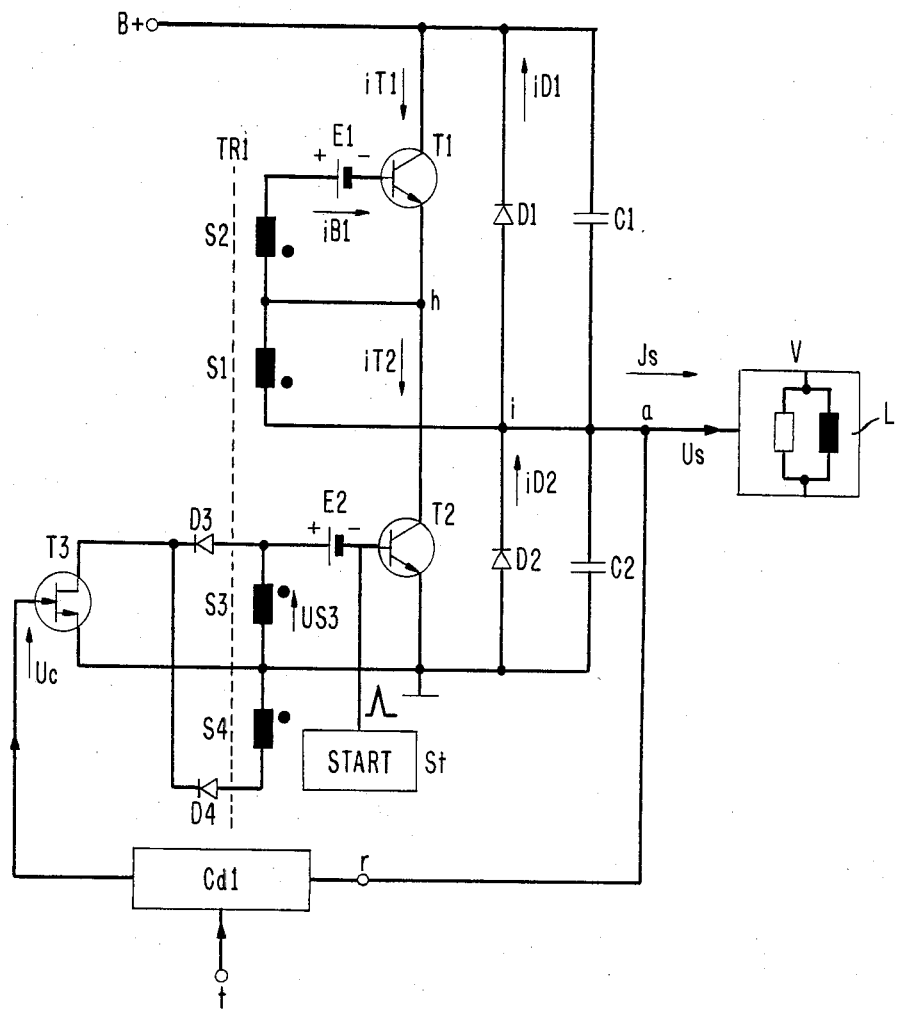
FIG. 1 is a diagram of an example circuit of the DC-AC converter.

Referring now to FIG. 1, there is shown a socalled semi-bridge circuit with two transistors T1, T2 disposed between the operating voltage +B and ground. The operating DC voltage +B can be provided by a rectified grid line voltage or by an accumulator or battery. Two control windings S2 and S3 of the transformer TR1 are connected to the base-emitter section of the transistors T1, T2. The diodes D1, D2 are coordinated to the transistors T1, T2, and these diodes are designated in the following as free wheeling diodes. Capacitors C1, C2 are disposed in parallel to the diodes, and these capacitors limit the steepness of the pulse rise of the alternating voltage Us generated at the terminal a. The connection point i of the diodes D1, D2 is connected directly to the connection point of the transistors T1, T2 in conventional circuits. However, according to the circuit of FIG. 1, these two connection points are separated. The connection point i is connected to the junction point h via additional winding S1. The alternating voltage Us generated at the terminal a is fed to the load V with the inductive component L and generates an alternating current iS for the load V. The output a is connected to the control terminal r of the control circuit Cd1. The control circuit Cd1 controls periodically the V-MOS transistor T3. The transistor T3 periodically shorts the windings S3 and S4 via the diodes D3, D4 and initiates the switching between the transistors T1, T2. Based on this path, the circuit is self-oscillating.

The additionally inserted winding S1 serves the following purpose. If the transistor T1 is conducting and thus the transistor T2 is blocked, the collector current iT1 flows via the winding S1 to the terminal a. Here the transformer TR1 operates as a current transformer such that the current iT1 running through the winding S1 generates a current in the winding S2 which is fed as a base current iB1 to the transistor T1. Based on a suitable adjustment of the winding ratio between the windings S1 and S2 as well as their polarity under consideration of the current amplification factor beta of the transistor T1, the current iT1 generates the desired base current iB1 for the transistor T1. In this case as is desired, the current iB1 is proportional to the current iT1 such that if the current iT1 increases so does the base current iB1.

Because of this base current adapted to the collector current, no special external power is required for the control. The current iT1 is advantageously used for generating the required base current by using the current transformation generated by the transformer TR1. The base current required for controlling the transistors is obtained from the magnetic energy of the transformer. The current iT1, which is generated by the winding S1, in the same way generates a current in the winding S3. Since however the winding S3 is disposed with opposite polarity relative to the winding S2, this current does not render the transistor T2 conducting but maintains the transistor T2 in a blocked state.

Figure 2:
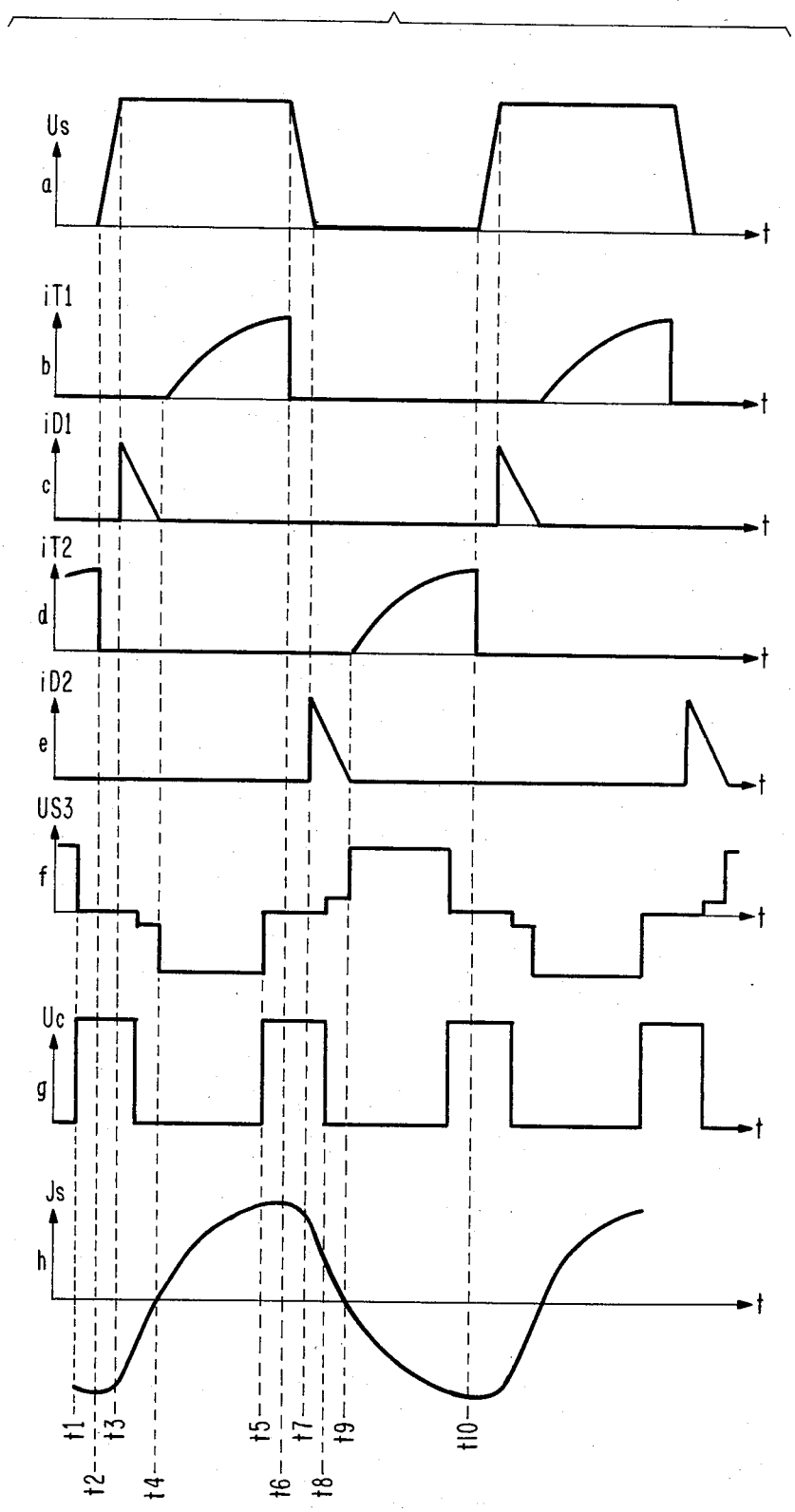
FIG. 2 is a diagram showing current characteristics depending on time for illustrating the mode of operation of FIG. 1.

If the transistor T1 is blocked and the transistor T2 is conducting, the collector current iT2 of the transistor T2 also flows through the winding S1 however in opposite direction relative to iT1. Since, however, the winding S3 is disposed in opposite polarity relative to the winding S2, the same mode of operation holds for the control of the transistor T2 via the collector current iT2 as holds for the transistor T1. Starting circuit St is connected to the base of the transistor T2. This starting circuit serves to control the transistor T2 into saturation with a pulse upon initial operation of the circuit such that the whole circuit becomes self-oscillating. During the operation of the circuit, the starter circuit Sd is without effect since the circuit operates self-oscillating. The mode of operation of the circuit according to FIG. 1 is illustrated in more detail in FIG. 2. The transistor T3 is controlled via the control circuit Cd1 at the point in time t1 such that the voltage Uc occurs at its gate electrode which renders it conductive. This causes the two windings S3, S4 to be shorted via the diodes D3, D4. The complete transformer TR1 then operates in short circuit operation such that practically no voltages are generated at all windings. The voltage Us3 at the winding S3 therefore goes to zero. Because of the emptying and depletion time the transistor T2 becomes nonconducting with a certain delay after it had been conducting before, such that the current iT2 collapses to zero at the point in time t2. The capacitor C2 is then no longer shorted via the transistor T2. Thereby the voltage Us can increase at the point a by the charge of the capacitor C2 via the inductive component L of the load V to the value +B. A current also flows via the capacitor C1 from time t2 to time t3 which capacitor C1 discharges current under oscillation. Then the diodes D1 becomes conducting at time t3 such that the current iD1 flows up to time t4 and no interruption of the current iS occurs. The current iD1 thus becomes possible since the load V comprises an inductive component L. The current iD1 becomes zero at the time t4. Since now another current path no longer exists, the current iS becomes zero at time t4. At this time the direction reversal of the current iS occurs. The transistor T1 becomes conducting at time t4 such that now the current flow iS starts in the opposite direction. The transistor T2 is blocked during this time with voltage Us3. The voltage Uc appears again at time t5 at the gate electrode of the FET T3, which voltage Uc induces the short circuit operation of the transformer TR1. The base control of the transistor T1 thus is eliminated. Therefore the current iT1 becomes zero at time t6 based on a certain delay. The current reception initially is performed by the capacitor C1, C2 up to time t7. The capacitor C1 is charged up to +B and the capacitor C2 is discharged. The diode D2 takes over the current iD2 at time t7, which current iD2 is collapsed to zero at time t9. At this time the transistor T2 is again switched via the voltage Us3, which causes the current iT2 to again begin to flow. The time t10 corresponds to the time t2.

Two additional voltages sources E1 and E2 are disposed in the windings S2 and S3, and the bases of the transistors T1 and T2. The two voltage sources E1 and E2 have a polarity in the blocking direction of the transistors T1, T2. These voltage sources have the following purpose. If the FET3 is rendered conductive because of the control by the Voltage Uc, then the windings S3, S4 are also shorted completely by the voltage Uc because of the flow voltage of the diodes D3, D4, such that small voltages still occur in the forward direction of the transistors T1, T2 even during short circuit operation at the windings S2, S3. The voltage sources E1 and E2 serve to accelerate the required blocking of the transistors T1, T2.

Figure 3:
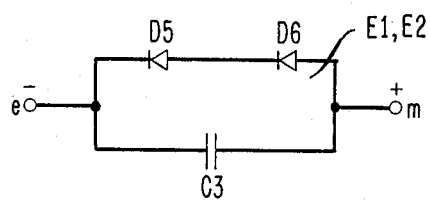
FIG. 3 is a view of a circuit in a detail realization of the diagram of FIG. 1.

Referring now to FIG. 3, there is shown a circuit which allows the realization and construction of the voltage sources E1, and E2. The circuit in each case comprises two diodes D5, D6 and the capacitor C3. This capacitor is provided of such a large capacitance that the voltage at the terminals e and m remains constant, and the bias in voltage effective in the blocking direction is formed.

Figure 4:
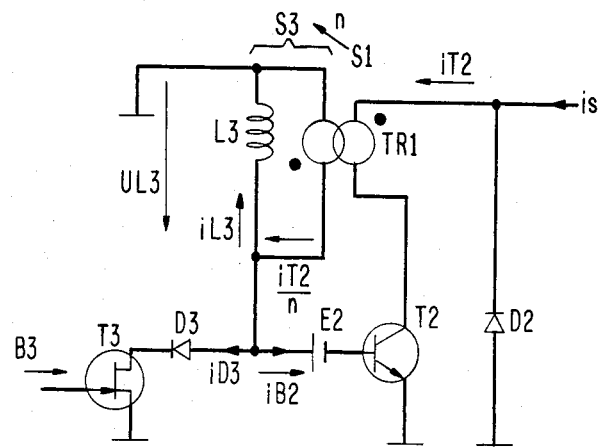
FIG. 4 is an equivalent network circuit for the transformer employed in FIG. 1.

An equivalent network diagram of the transformer TR1 is shown in FIG. 4 for illustrating in more detail the controlling via the transistor T3. L3 designates the leakage induction of the transformer TR1 as considered from the side of the winding S3. The energy stored in the core of the transformer TR1 is represented by the magnetization current iL3.

Figure 5:
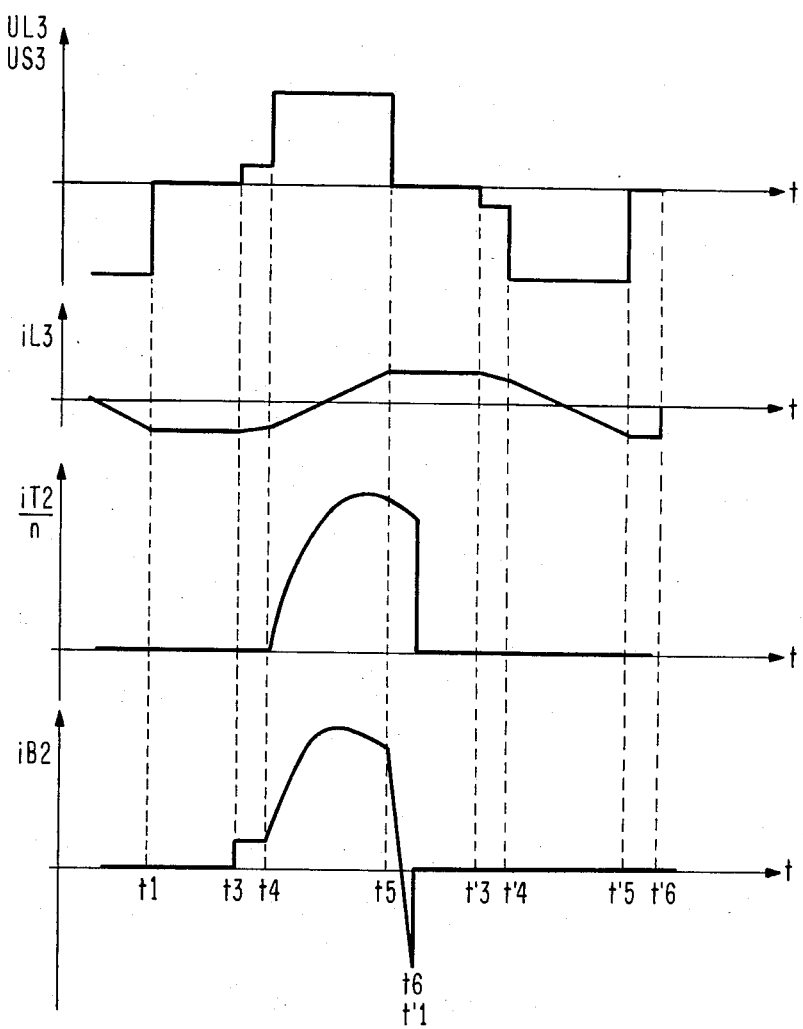
FIG. 5 is a view of curves for illustrating the operation of the equivalent network circuit according to FIG. 4.

FIG. 5 shows in principle the control voltages for the control of the transistor T2. The current iL3 is negative from time t1 to time t3 and remains constant since the voltage vL3 is approximately zero. The current iL3 flows via the diode D3 and the transistor T3.

The current is always negative from time t3 to time t4. The diode is conducting. The current iT2 is approximately zero. The current iS flows via the diode D2. The current iS3 is approximately equal to the current iB2, which initiates and prepares the conducting phase of the transistor T2, before its direction is changed. The current changes its direction at time t4, the diode D2 is blocked and iT2 becomes equal to the current iS. The secondary current iT2/n where n is approximately equal to 6 increases the base current iB2 in order to maintain the saturation of the transistor T2. At the same time the base-emitter voltage Ube of the transistor T2 increases by about one volt which increases the steepness of the slope of the current iL3. The current iL3 therefore is closed via the voltage source E2 and the base collector section of the transistor T2. The current iL3 runs through the zero value during the conducting phase of the transistor T2, that is, from time t4 to time t6. This corresponds to a phase shift of 90 degrees between the voltage and the current in an inductivity in case of a sine curve course.

The current iL3 is then positive at the end of the conducting phase of the transistor T2 and is drawn off the current iT2/n in order to form the current iB2 according to FIG. 5. The conducting phase of the transistor T3 and of the diode D3 effects a rapid decay of the current iB2 during the time t5 to t6 and effects a blocking of the transistor t2 after the so-called emptying and depeletion times. The current iL3 has a positive direction from the time t6, or t'1, to t'3, and the current iL3 no longer corresponds to a conducting phase of the transistor T2 but to a conducting phase of the transistor T1. The following time period from t'1 to t'5 corresponds to the conducting phase of the transistor T1 according to the same principle as the transistor T2 from the time t1 to t5. The current iL3 again becomes negative at the end of the conducting phase of the transistor T1, and the current iL3 effects the conducting phase of the transistor T3. In this way the two transistors T1 and T2 are switched alternatingly to a conducting state and to a blocked state.

The inductivity L3 is disposed about a minimum value which is dependent on the amplification of the transistor, on the frequency and on the voltage vC2+Ube.

From this its results that the current of the diode D2, which is generally substantially larger than the current iL3, is not permitted to flow through the primary winding S1 of the transformer TR1. If, during the time from t1 to t3, the current iT2/n has a value which is too high, this would prevent the current iB2 such that the transistor T2 cannot become conducting. Otherwise the circuit would not work without problems.

Figure 6:
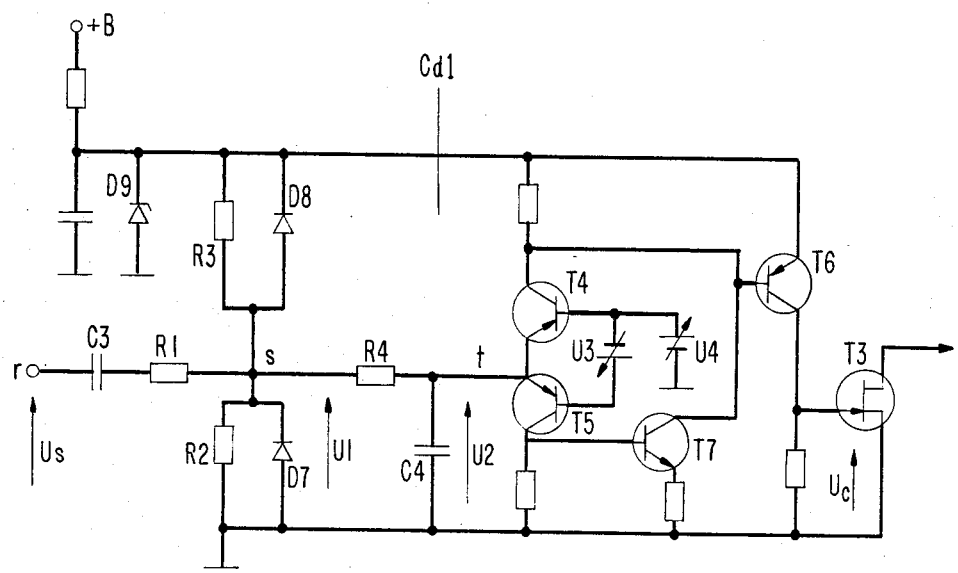
FIG. 6 is a view of a practical embodiment of the control circuit employed in FIG. 1.
Figure 7:
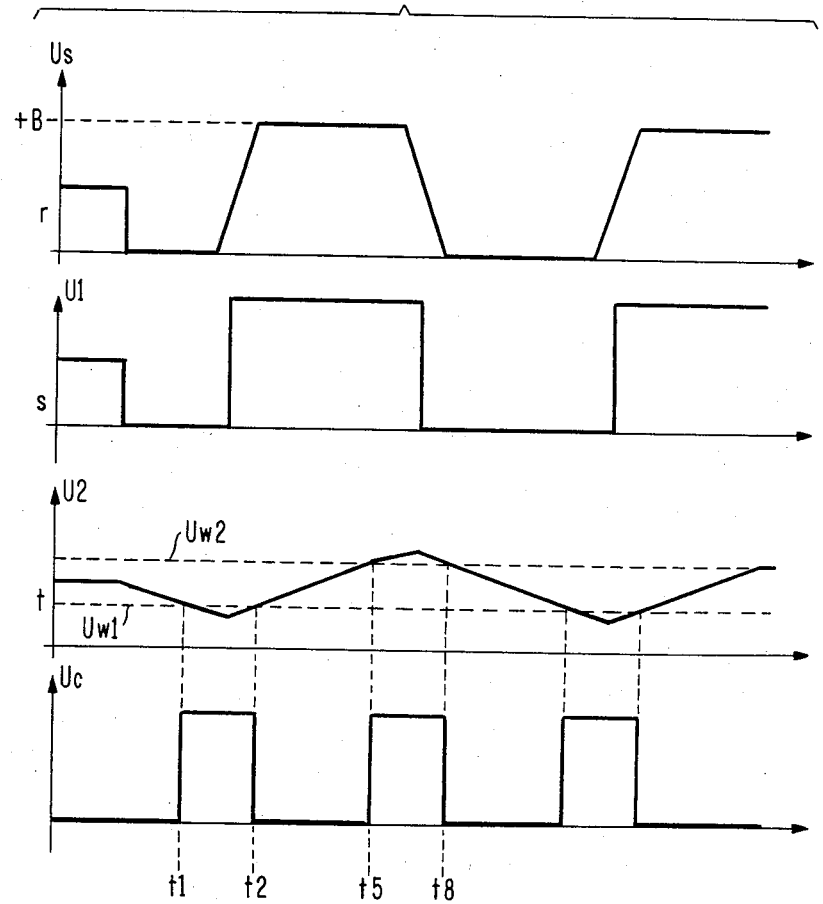
FIG. 7 is a view of a diagram showing curves illustrating the control circuit according to FIG. 6.

The construction and the mode of operation of the control circuit Cd1 is described by FIG. 6 and 7. The control circuit Cd1 serves to control the transistor T3 and thus for control of the phase of each transistor T1, T2, which is conducting at that instant. The output voltage Us from the point a in FIG. 1 is applied to the input terminal r of the control circuit Cd1. The operating voltage +B is stabilized with the diode D9 and is limited to a value of about +12 volts. The voltage Us with the diode D7 is maintained at about zero at the point S. Thus at the point S a voltage U1 is present because of the effect of the capacitor C3 and of the resistor R1. The amplitude of the voltage U1 is independent of the amplitude of the voltage Us. The resistor R4 and the capacitor C4 form an integrating member for the voltage U1. This causes the generation of a sawtoothed shaped voltage U2 at the time t1. The threshold circuit with the transistors T4 and T5 includes two threshold values fixed by the voltage sources U3 and U4. The voltage U2 is compared to the voltage sources U3 and U4. The lower threshold value Uw1 is formed by the voltage source U4 via the transistor T4 and the sum voltage U3+U4 forms the upper threshold Uw2 via the transistor T5. If the voltage Us has reached the lower value then the voltage U1 is equal to zero. Therefore the voltage U2 decreases and is lower than the lower threshold value Uw1 at the point in time t1. This renders the transistor T4 conducting and controls the transistors T6 and T3 to conduct. This generates at the gate electrode of the transistor T3 the voltage Uc also shown in FIG. 1, which renders transistor T3 conducting.

The voltage Us increases again after the delayed switching of the power stage according to FIG. 1, and the voltage Us reaches the operating voltage +B. The current via the capacitor C3 and the resistor R1, which is now in opposite direction, is slightly larger than the current through the resistor R4 such that now the diode D8 becomes conducting. The voltage U1 rapidly assumes the operating voltage of +12 volts and generates an increasing voltage slope U2. The transistor set T6 and T3 are blocked only if the voltage Us has reached the operating voltage +B.

The voltage U2 surpasses the upper threshold value Uw2 at the time t5. The transistors T5, T7, T6 and T3 remain conducting as long as the voltage Us has not dropped to zero. Correspondingly and in a symmetrical way, during the decreasing flank slope of the voltage Us the voltage U1 becomes equal to zero, the voltage U2 drops and the complete process is repeated. The frequency depends on the difference between the upper and the lower threshold value in the case of a given RC network. The pulse duty factor of the output voltage Us depends on the average value between the upper and the lower threshold value. If this value is equal to half of the operating voltage +B of the control circuit Cd1, the pulse duty factor is equal to one half. In addition, the control circuit Cd1 can be influenced at the terminal t as shown in FIG. 1 such that the frequency of the voltage Us or of its pulse duty factor and thus the effective value can be changed. This can be accomplished by a change in the voltage sources U3 and U4.

The circuit according to FIG. 6 further comprises, in principle, an amplitude limiter incorporating the diodes D8 and D7 for the voltage Us, and RC member R4-C for effecting a time measurement threshold circuit with the transistors T4, T5 and voltage sources U3, U4 as well as a control circuit with the transistors T6, T7 for controlling the transistor T3 which serves as the switch for shorting the winding S3 according to FIG. 1.

The capacitors C1 and C2 in FIG. 1 limit the steepness of the slope of the generated alternating voltage Us. These capacitors can be disposed immediately in parallel to the collector-emitter section of the transistors T1, T2 according to FIG. 1.

It will be understood that each of the elements described above, or two or more together, may also find a useful application in other types of system configurations and DC-AC converter procedures differing from the types described above.

While the invention has been illustrated and described as embodied in the context of a DC-AC converter for a load with inductive components, it is not intended to be limited to the details shown, since various modifications and structural changes may be made without departing in any way from the spirit of th present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A DC-AC converter for energizing a load including an inductive component comprising
    a direct current voltage source;
    a first transistor connected with one of its power leads to the direct current voltage source an having a second power lead;
    a second transistor connected with one of its power leads to the second power lead of the first transistor via a first junction point;
    a load including an inductive component and having an input;
    a first free wheeling diode connected with a terminal to the direct current power source and having a second terminal;
    a second free wheeling diode connected with one terminal to the second terminal of the first free wheeling diode via a second junction point, which is further connected to the input of the load;
    an auxiliary winding of a transformer connecting the first junction point to the second junction point;
    a second control winding of the transformer connected to a control input of the second transistor and to the second power lead of the second transistor;
    an electronic switch connected in parallel to the second winding of the transformer;
    a control circuit connected with an output to a control input of the electronic switch and having an input connected to the second junction point for initiating a periodic switching.

2. The DC-AC converter for energizing a load according to claim 1 further comprising
    a first control winding of the transformer connected to a control input of the first transistor and to the first junction point where the windings of the transformer are switched over such that they become alternatingly conducting and that they are both blocked during an intermediate rest time; and
    wherein the free wheeling diodes take over the current conduction during the intermediate rest time.

3. The DC-AC converter for energizing a load according to claim 2 further comprising connecting the control sections of the first and second transistor to a first control winding and to a second control winding of the transformer.

4. The DC-AC converter for energizing a load according to claim 2 wherein the first and second control winding and the auxiliary winding have such a rotary winding sense and are connected with their terminals such that the current flowing through the auxiliary winding of the first and second transistor generate in the first and second control winding the base currents necessary for the control of the first and second transistors.

5. The DC-AC converter for energizing a load according to claim 2 wherein the control section of the second transistor is connected to the winding running parallel relative to the electronic switch.

6. The DC-AC converter for energizing a load according to claim 2 further comprising
    a first capacitor disposed in parallel to the first free wheeling diode; and
    a second capacitor disposed in parallel to the second free wheeling diode.

7. The DC-AC converter for energizing a load according to claim 2 further comprising
    a first capacitor disposed in parallel to the collector-emitter section of the first transistor; and
    a second capacitor disposed in parallel to the collector-emitter section of the second transistor.

8. The DC-AC converter for energizing a load according to claim 2 further comprising
    a second voltage source disposed in the provided connection between the first control winding and the base of the first transistor with a polarity corresponding to a blocking of the first transistor.

9. The DC-AC converter for energizing a load according to claim 8 wherein the second voltage source is provided by a parallel connection of a diode and a capacitor.

10. The DC-AC converter for energizing a load according to claim 1 further comprising
    a third voltage source disposed in the provided connection between the second control winding and the base of the second transistor with a polarity corresponding to a blocking of the second transistor.

11. The DC-AC converter for energizing a load according to claim 10 wherein the voltage source is provided by a parallel connection of a diode and a capacitor.

12. The DC-AC converter for energizing a load according to claim 1 wherein the control circuit comprises a voltage limiter, a time constant member, and a threshold circuit.

13. The DC-AC converter for energizing a load according to claim 12 wherein the threshold circuit is constructed with two thresholds.

14. The DC-AC converter for energizing a load according to claim 13 wherein the threshold values for changing the frequency and the pulse duty factor can be adjusted.

15. A DC-AC converter for energizing a load including an inductive part comprising
  a series connection of two transistors disposed between the direct current voltage terminals of a DC power supply;
  a transformer having first and second windings which are switched such that they are alternatingly conducting and are blocked during an intermediate rest time;
  two free wheeling diodes disposed in parallel to the transistors taking up the current during the intermediate rest time;
  a voltage output derived from a connection point of the first and second transistor;
  an additional winding of the transformer connecting a junction point of the free wheeling diodes to the junction point of the two transistors;
  an electromagnetic switch disposed in parallel to one of the windings of the transformer; and
  a control circuit having an input connected to the voltage output and having an output controlling the electronic switch.

16. A method for converting DC into AC for energizing a load including an inductive part comprising
  turning on a control transistor conducting with a signal from a control circuit;
  short circuiting windings of a transformer with the conducting control transistor;
  blocking the transmission of a second transistor based on one of the short circuited windings connected to the base of the second transistor;
  charging a second capacitor connected to a power terminal of the second transistor;
  charging a first capacitor connected to a power terminal of a first transistor;
  reversing the direction of an output current coming from a junction point of a connection between the two capacitors; putting the first transistor into a conducting state;
  blocking a current flow in the second transistor;
  operating the transformer in a short circuit mode; and moving the current flow from the first transistor to a first capacitor in parallel to a diode.

* * * * *